(12) United States Patent
Bordawekar et al.

(10) Patent No.: US 8,380,643 B2
(45) Date of Patent: Feb. 19, 2013

(54) SEARCHING MULTI-DIMENSIONAL DATA USING A PARALLELIZATION FRAMEWORK COMPRISING DATA PARTITIONING AND SHORT-CUTTING VIA EARLY OUT

(75) Inventors: Rajesh R. Bordawekar, Yorktown Heights, NY (US); Bugra Gedik, White Plains, NY (US); Alexander C. Lang, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 12/569,943

(22) Filed: Sep. 30, 2009

(65) Prior Publication Data

US 2011/0078133 A1  Mar. 31, 2011

(51) Int. Cl.
*G06F 15/18* (2006.01)
(52) U.S. Cl. ............................................. 706/12
(58) Field of Classification Search ............... 706/12, 706/45, 62
See application file for complete search history.

(56) References Cited

U.S. PATENT DOCUMENTS

| 2003/0033300 A1* | 2/2003 | Bergman et al. | 707/5 |
| 2006/0080285 A1* | 4/2006 | Chowdhuri | 707/3 |
| 2010/0192148 A1* | 7/2010 | Chen et al. | 718/1 |

OTHER PUBLICATIONS

Sun, Incremental Quantitative Rule Derivation by Multidimensional Data Partitioning, Apr. 27, 2001, IEEE, pp. 1-10.*
Schwartz et al., On Efficiently Processing Nearest Neighbor Queries in a Loosely Coupled Set of Data Sources, 2004, ACM, pp. 184-193.*
Rencuzogullari et al., Dynamic Adaption to Available Resources for Parallel Computing in an Autonomous Network of Workstations, 2001, ACM, pp. 72-81.*
Ferhatosmanoglu et al., Constrained Nearest Neighbor Queries, 2001, Springer-Verlag, pp. 1-20.*
Papadopoulos et al., Parallel Processing of Nearest Neighbor Queries in Declustered Spatial Data, 1997, ACM, pp. 1-9.*
Qi et al., Multi-Dimensional Circuit and Micro-Architecture Level Optimization, Jul. 2007, IEEE, pp. 1-6.*
Faloutsos et al. Fastmap: a fast algorithm for indexing, data-mining and visualization of traditional and multimedia datasets. SIGMOD Rec., 24(2):163-174, 1995.
Friedman et al. An algorithm for finding best matches in logarithmic expected time. ACM Trans. Math. Softw., 3(3):209-226, 1977.
Guttman. R-trees: A dynamic index structure for spatial searching. In B. Yormark, editor, SIGMOD'84, Proceedings of Annual Meeting, Boston, Massachusetts, Jun. 18-21, 1984, pp. 47-57. ACM Press, 1984.
Qiao et al. Main-memory scan sharing for multi-core cpus. Proc. VLDB Endow., 1(1):610-621, 2008.
Roussopoulos et al. Nearest neighbor queries. In M. J. Carey and D. A. Schneider, editors, Proceedings of the 1995 ACM SIGMOD International Conference on Management of Data, San Jose, California, May 22-25, 1995, pp. 71-79. ACM Press, 1995.

(Continued)

*Primary Examiner* — David Vincent
(74) *Attorney, Agent, or Firm* — Ryan, Mason & Lewis, LLP

(57) ABSTRACT

Techniques for searching multi-dimensional data are provided. The techniques include providing a parallelization framework for a search algorithm, wherein the search algorithm exposes one or more architecture-sensitive tunable optimization parameters, and using the one or more architecture-sensitive tunable optimization parameters to tune the search algorithm to search multi-dimensional data in any underlying architecture.

22 Claims, 11 Drawing Sheets

OTHER PUBLICATIONS

Seidl et al. Optimal multi-step k-nearest neighbor search. In SIGMOD '98: Proceedings of the 1998 ACM SIGMOD international conference on Management of data, pp. 154-165, New York, NY, USA, 1998. ACM.

Weber et al. A quantitative analysis and performance study for similarity-search methods in high-dimensional spaces. In A. Gupta, O. Shmueli, and J. Widom, editors, VLDB'98, Proceedings of 24rd International Conference on Very Large Data Bases, Aug. 24-27, 1998, New York City, New York, USA, pp. 194-205. Morgan Kaufmann, 1998.

White et al. Similarity indexing with the ss-tree. In ICDE '96: Proceedings of the Twelfth International Conference on Data Engineering, pp. 516-523, Washington, DC, USA, 1996. IEEE Computer Society.

Arge. The buffer tree: A new technique for optimal i/o-algorithms (extended abstract). In WADS '95: Proceedings of the 4th International Workshop on Algorithms and Data Structures, pp. 334-345, London, UK, 1995. Springer-Verlag.

* cited by examiner

FIG. 1

Let $c :=$ root node, $R := \emptyset$ before the first call.

function getKNN ( $c, q, k, R$ )
(1)    let $v$ be the vector at $c$.
(2)    if $c$ is inner node and distance $d(q, H1)$ between $q$ and half-space of first child is smaller than $k$th NN in $R$,
(3)       call getKNN( first child, $q, k, R$ ).
(4)    if $c$ is inner node and distance $d(q, H2)$ between $q$ and half-space of second child is smaller than $k$th NN in $R$,
(5)       call getKNN( second child, $q, k, R$ ).
(6)    if distance $d(q, v)$ is smaller than $k$th NN in $R$,
(7)       $R := R + v$.
(8)    return.
endfunction

FIG. 7
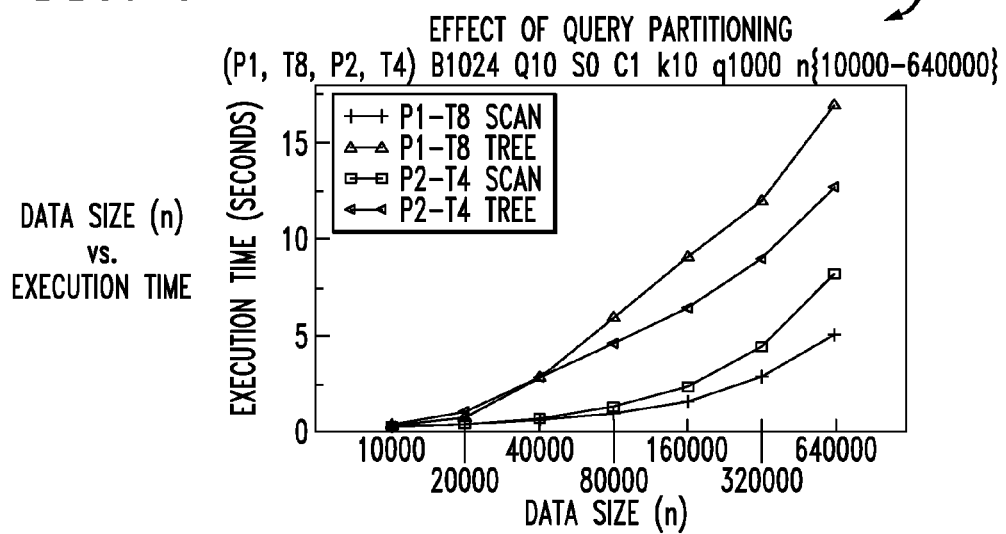
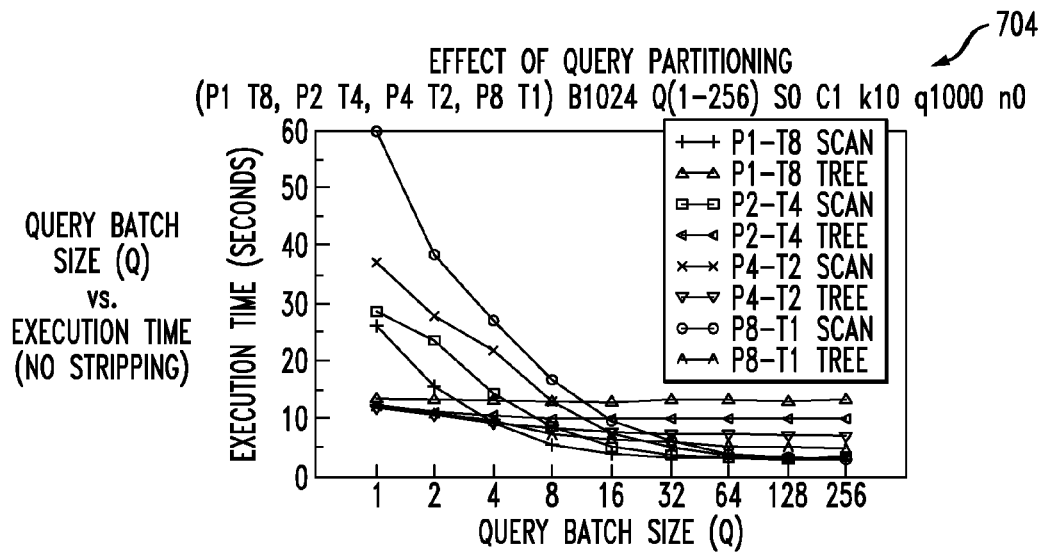
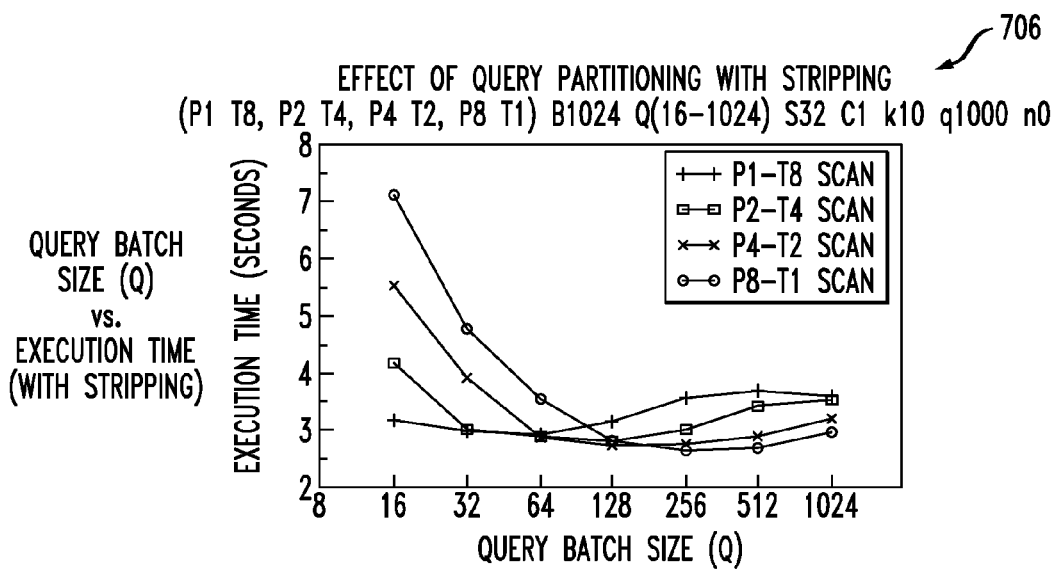

SEARCHING MULTI-DIMENSIONAL DATA USING A PARALLELIZATION FRAMEWORK COMPRISING DATA PARTITIONING AND SHORT-CUTTING VIA EARLY OUT

FIELD OF THE INVENTION

Embodiments of the invention generally relate to information technology, and, more particularly, to data searching.

BACKGROUND OF THE INVENTION

Many applications in the multimedia and scientific space require fast multi-dimensional search capabilities. At the same time, there is an emergence of commodity hardware with multi-core processors. However, existing algorithms for multi-dimensional searching cannot exploit underlying parallelism and/or are difficult to efficiently port to the various hardware platforms.

Large high-dimensional datasets are becoming ubiquitous. Many applications require the retrieval of data items similar to a given query item, or the nearest neighbors (NN) of a given item. Another common requirement is the retrieval of multi-NN, that is, multiple NN for different query items on the same data. With multi-core central processing units (CPUs) becoming more and more widespread at lower costs, developing parallel algorithms for the above-mentioned exemplary search problems presents additional challenges.

SUMMARY OF THE INVENTION

Principles and embodiments of the invention provide techniques for searching multi-dimensional data. An exemplary method (which may be computer-implemented) for searching multi-dimensional data, according to one aspect of the invention, can include steps of providing a parallelization framework for a search algorithm, wherein the search algorithm exposes one or more architecture-sensitive tunable optimization parameters, and using the one or more architecture-sensitive tunable optimization parameters to tune the search algorithm to search multi-dimensional data in any underlying architecture.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating a k-NN search algorithm on k-d-tree, according to an embodiment of the invention;

FIG. 7 includes graphs illustrating effect of query partitioning, according to an embodiment of the present invention;

DETAILED DESCRIPTION OF EMBODIMENTS

Figure 2:
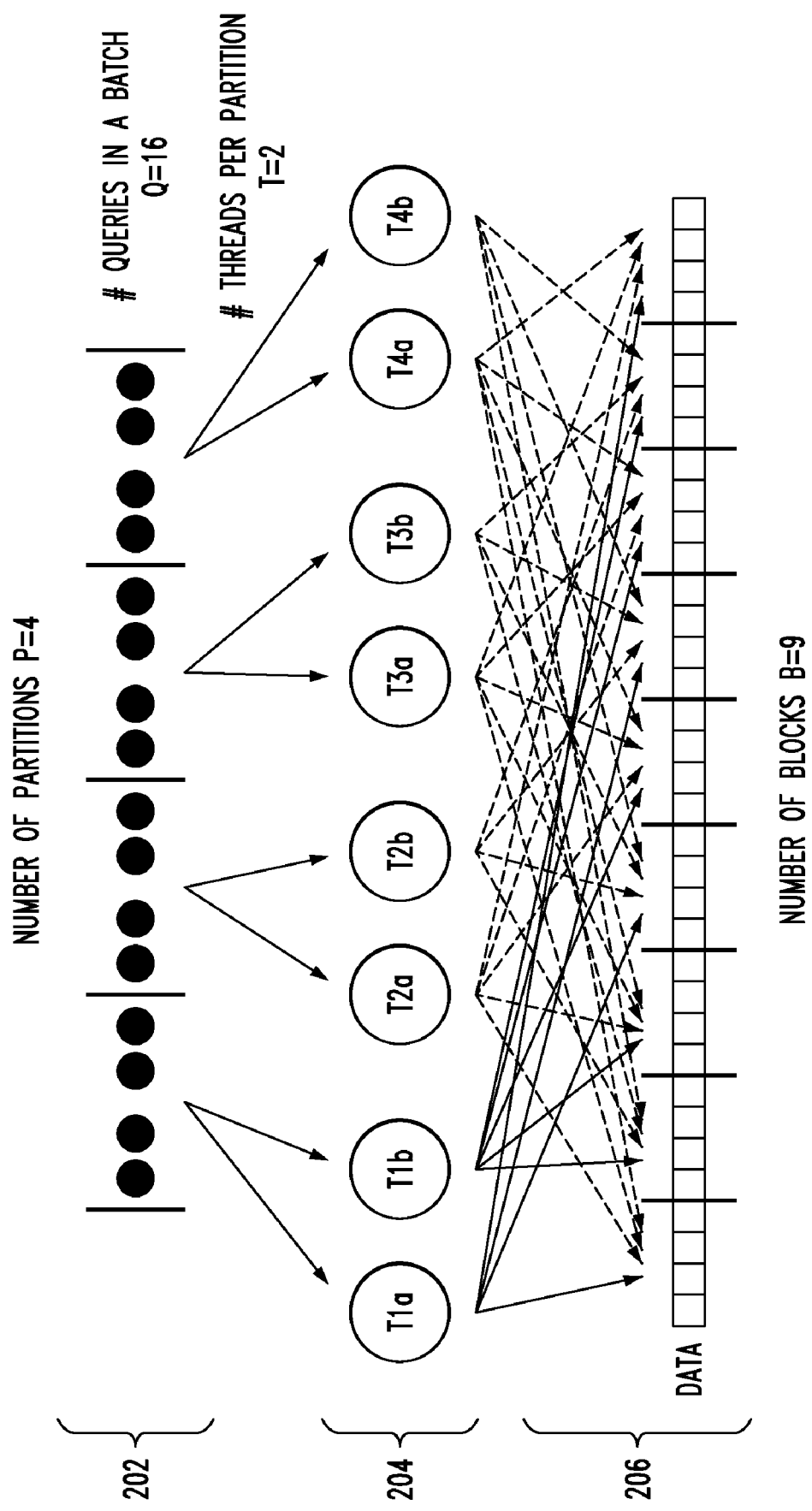
FIG. 2 is a diagram illustrating optimization parameters, according to an embodiment of the invention.

Principles of the invention include parameterizing and auto-tuning parallel scan algorithms for searching multi-dimensional data. One or more embodiments of the invention include a parallelization framework for index and scan based search algorithms that expose several architecture-sensitive tunable optimization parameters. Such parameters allow a user to tune the search algorithm to any underlying architecture. Also, one or more embodiments of the invention include an auto-tuning layer on top of the framework that determines the optimal tuning parameters for a given hardware platform with minimal user intervention.

As described herein, the framework used in one or more embodiments of the invention can provide knobs including, for example, query batching, query partitioning, data partitioning, short cutting via early-out, and data striping. Query batching determines which queries are evaluated simultaneously. Query partitioning determines how the queries are assigned across multiple processors. Data partitioning determines how the data items are distributed across multiple processors. Early-out enables sharing of local search information across processors in order to reduce individual search times. Also, data striping determines the data memory layout to improve cache locality.

In one or more embodiments of the invention, for a given query workload and data, the auto-tuning layer initializes the knobs and iteratively traverses the space of knob settings while measuring the query performance at each step until a steady state is reached. By way of example, simulated annealing can be used as the iterative optimization algorithm.

The techniques detailed herein can also include auto-tuning nearest neighbor (NN) algorithms on multi-core architectures. One or more embodiments of the invention use tuning knobs (as described herein) to increase the query throughput for parallelized versions of classes of high-dimensional multi-NN search algorithms such as linear scan and tree traversal. Also, an offline auto-tuner for setting these knobs can be used by iteratively measuring actual query execution times for a given workload and dataset.

A definition of accelerating nearest neighbor queries can include the following: Given a dataset V of N d-dimensional vectors and a query vector q, the k-nearest neighbor query (NN-query) returns the set $NN_q(k) \subseteq V$ that contains exactly k vectors and for which the following condition holds:

$$\forall v \in NN_q(k), \forall v' \in V - NN_q(k): d(v,q) \leq d(v',q).$$

Note that NNq (k) is non-deterministic if there are multiple vectors with equal distance from q among the k-th nearest neighbors. For datasets from image repositories, for example, it would be extremely rare to find identical distances. On the other hand, this property allows one to upper-bound the memory footprint required to keep search states within threads.

In many applications, it is possible to batch multiple NN-queries together. By way of example, when searching for movie segments similar to a given segment, one may obtain feature vectors for each frame or shot of the query segment, and run NN-queries for each in order to find similar frames or shots and ultimately similar segments. Another example can include image search engines with thousands of users issuing queries concurrently. As detailed herein with respect to one or more embodiments of the invention, by batching queries, the concurrently running queries may be able to share cache content, thereby increasing the query throughput.

A definition of the multi k-NN search problem can include the following: Given a dataset V of N d-dimensional vectors and Q query vectors $q_1, \ldots, q_Q$, the multi k-nearest neighbor query (MNN-query) returns the set $\{NN_{q1}(k), \ldots, NN_{qQ}(k)\}$ of k-nearest neighbors for each $q_i$.

As described herein, one or more embodiments of the invention the use of a scan and tree algorithm. For example, the k NNs for a given query vector q can be computed by scanning all vectors, computing the distances, and storing the closest k. This improves cache locality because central processing units (CPUs) read a whole cache line of vectors into L2 cache with the access of the first vector of that line. Subsequent vector reads can therefore be served directly from cache. This algorithm is referred to herein as "scan."

One or more embodiments of the invention can also include using tree-based index structures to reduce the amount of vectors that have to be inspected. For example, a k-d-tree can be used for in-memory high-dimensional NN-search, as it provides O(logN) search time for N randomly distributed vectors. A k-d-tree partitions the data space recursively into two half-spaces at each tree node such that both halves contain the same number of vectors. The tree node itself represents the vector that defines the axis-parallel partitioning plane. In one or more embodiments of the invention, it is presumed that the dimension with the largest value range is selected for partitioning.

FIG. 1 is a diagram illustrating a k-NN search algorithm 102 on k-d-tree, according to an embodiment of the invention. The algorithm repeatedly prunes half-spaces that are farther away than the current kth NN, because these cannot contain any closer vectors. This algorithm is referred to herein as "tree."

Additionally, one or more embodiments of the invention do not intend to compare a scan and a tree algorithm, but, rather, pick the two algorithms as examples for "scan-like" and "tree-like" algorithms and how the auto-tuned optimizations described herein facilitate their respective query throughput.

As should be understood by one of skill in the art, the optimizations detailed herein are independent of the underlying search algorithm and would apply to many other algorithms as well.

The techniques described herein also include the use of a parallel multi-query algorithm. As such, one or more embodiments of the invention parallelize both the scan and tree algorithm to make them applicable to the MNN problem.

FIG. 2 is a diagram illustrating optimization parameters, according to an embodiment of the invention. By way of illustration, FIG. 2 depicts partitions of queries 202, threads (per partition) 204 and blocks 206. FIG. 2 depicts various optimization parameters considered for both scan and tree. The input shown in 202 includes a set of NN-queries. The optimal size Q of this set will depend, for example, on the cache sizes per core because status information needs to be kept per query and if Q is too large, thrashing may occur. If too small, there will be less benefit from sharing read vector data.

Also, the query vectors can be further partitioned into P sets. Each set is processed by T threads (as shown, for example, with 204). The optimal values for P and T will depend on various architectural details such as the number of cores, cache sizes, etc. All threads working on the same query subset will then read the vectors in a block-cyclic fashion. In other words, whenever a thread finishes, it will pick the next block of data not yet processed.

The number of blocks the data is split into is B. In the case of the tree algorithm, one tree index is built per data block. Also, the data can be stored in stripes of a certain size S. With data striping, the first S dimensions of each vector are stored, followed by the next S dimensions, and so on. This further improves cache locality. By setting Q=1, T=1, P=1, B=1, S=1, the algorithm becomes the underlying NN-query algorithm.

As a summary, the table below depicts the parameters used herein.

| Parameter | Description |
| --- | --- |
| N | number of vectors in the dataset |
| d | number of dimensions per vector |
| k | number of the nearest neighbors |
| Q | query batch size |
| P | number of query partitions |
| T | number of threads per partition |
| B | number of data blocks |
| S | data striping size in dimensions |

As detailed herein, even for sequential execution, algorithmic optimizations are possible for both the scan and tree algorithm. Because the evaluation time of quadratic form distance functions grows quadratically with the number of dimensions, reducing this component of the overall cost can improve high-dimensional NN-search performance. Once NN candidates are determined, their largest distance from the query vector can be used to shortcut all following distance calculations. If, for example, the Euclidean distance is used, the summing of the squares can be terminated once the partial sum exceeds the largest possible NN-distance found so far. When introducing parallelism further down, this shortcutting will be even more useful because multiple largest NN-distances from different parts of the data set are determined concurrently, thus leading to a higher likelihood of early termination of the distance calculation.

Figure 3:
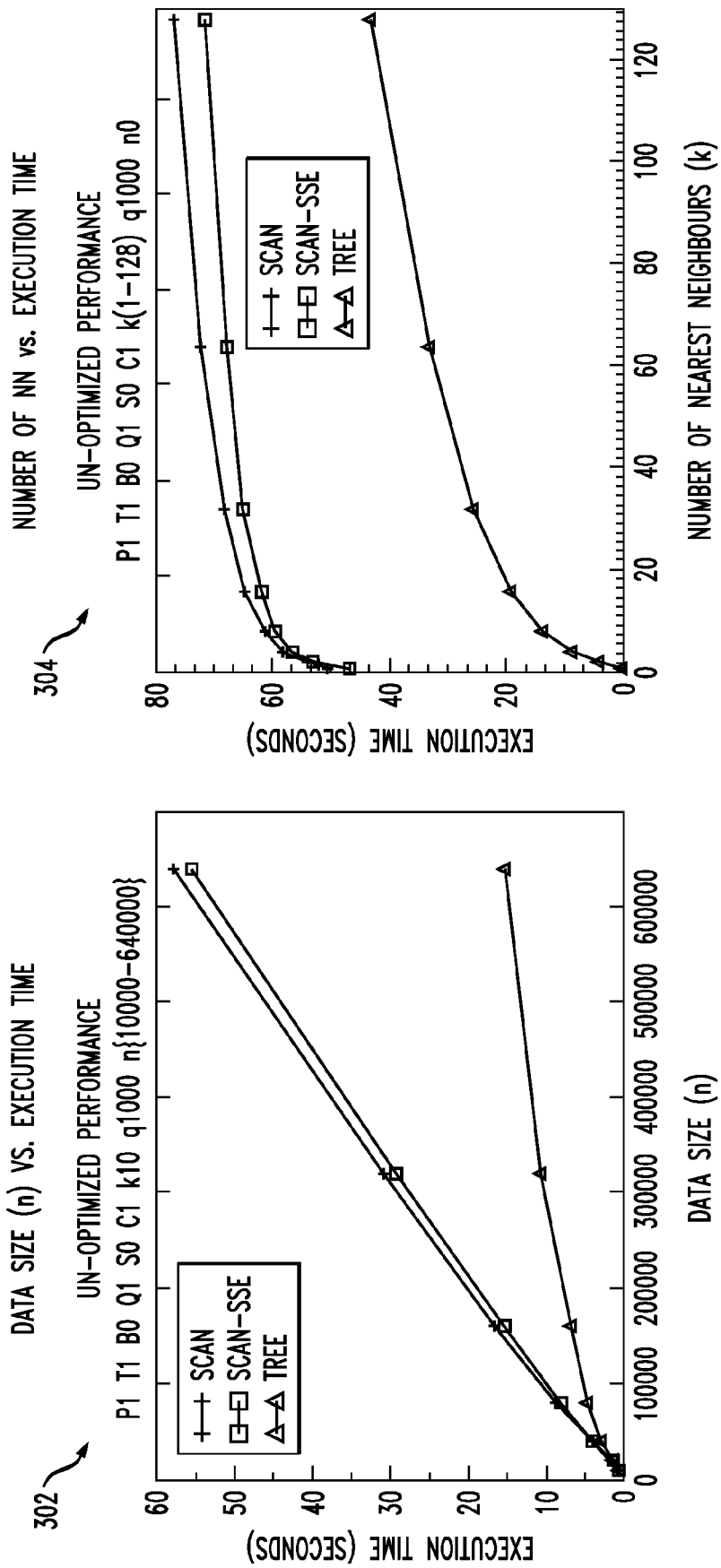
FIG. 3 includes graphs illustrating basic performance with shortcutting, according to an embodiment of the present invention.

FIG. 3 is a diagram illustrating basic performance with shortcutting, according to an embodiment of the present invention. In one or more embodiments of the invention, the shortcutting optimization can be implemented for both the scan and the tree algorithm. Graph 302 plots the search time for 1,000 queries as a function of the data size. The tree algorithm is significantly faster than the scan algorithm (line with crosses). While the scan time grows linearly with the data size, the tree search time is slightly sub-linear since it can prune larger amounts of data that do not require any distance calculations subsequently.

Graph 304 plots the search time as a function of the number of NNs requested. While the tree's increasing search time can be explained by the reduced pruning power with more NNs requested, the scan's search time should not depend on the number of NNs because it always scans all vectors. The reason there is still an increase in search time is due to the fact that the current best k NNs is stored in a heap data structure. The height of this heap grows logarithmically with k. Because the overall search time includes a constant part (the reading of the vectors and distance calculations, here about 46 s) and a logarithmic part (the heap operations, here between 0 and 30 s), a logarithmic behavior is seen for scans. As such, cost components that were negligible for disk-based search algorithms can have a significant impact on memory-based algorithms.

One or more embodiments of the invention also include multi-threading (for example, a tuning step of introducing multiple concurrent threads). Extending the algorithms to multi-threading can be achieved, for example, by concurrently performing the data exploration for a single query and by allowing multiple pending queries to run concurrently.

Figure 4:
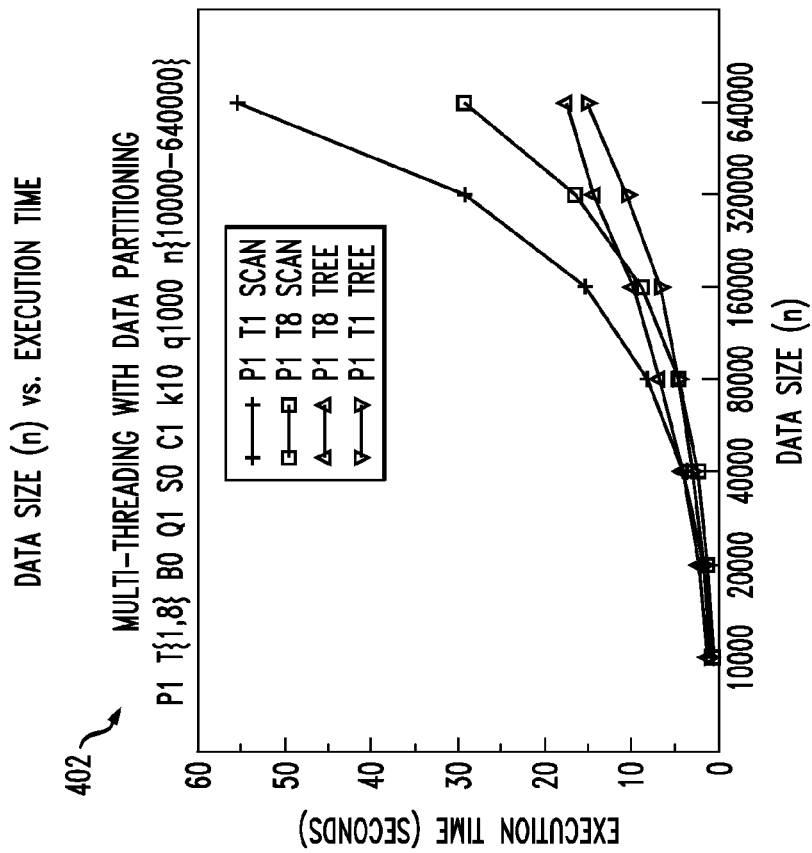
FIG. 4 includes graphs illustrating multi-threading with data partitioning, according to an embodiment of the present invention.

FIG. 4 includes graphs illustrating multi-threading with data partitioning, according to an embodiment of the present invention. In order to execute a single query with T concurrent threads, the data can be split into B=T equally sized blocks. For the scan algorithm, T concurrent scans can be run, one on each data block. For the tree algorithm, B index structures can be built (this can be done, for example, offline, not as part of the query time) and the tree traversal algorithm (for example, from FIG. 1) can be run concurrently on each index. The resulting query response time for different dataset sizes is shown in graph 402 (the x-axis is in logarithmic scale).

The scan algorithm with both one thread (cross symbol) and eight threads (box symbol) is linear in the number of data vectors, with the multi-threaded version being nearly twice as fast. The reason why perfect scale-up is not seen with T is because the scans in the different data blocks finish at different times due to different amounts of short-cutting. The thread that encounters many shortcuts will finish sooner than a thread with few shortcuts. As a result, the former thread will sit idle until all threads have finished. As such, the scale-up is sub-optimal because the load is not evenly distributed across the T threads, but, as detailed herein, can be improved by introducing finer-grained data partitioning.

The tree algorithm is sub-linear in the data size. Also, each of the multiple threads running concurrently performs random memory accesses during the tree traversal. There are O(T log(N T)) such random accesses compared to O(log(N)) random accesses for the sequential tree algorithm. With more read requests, the memory sub-system bottleneck increases, eventually slowing down all threads. In contrast, the scan algorithm has much better cache locality since each thread reads vectors sequentially, leading to a memory access only for the first vector of a cache line. The memory subsystem is therefore much less of a bottleneck.

Graph 404 depicts the query performance for different degrees of parallelism. The scan algorithm performance decreases until about eight threads, after which it increases. This indicates that with more than eight threads, the conflicting memory read requests from the threads start to saturate the memory subsystem. For this architecture, using eight threads is therefore the best choice. The tree graph shows that the tree algorithm saturates the memory already after one or two threads. As such, for this architecture, the sequential tree algorithm can be preferred. However, one skilled in the art would appreciate that for different cache sizes and memory bandwidths, these numbers could be very different. The right tuning of T is therefore very architecture-dependent.

One or more embodiments of the invention can also include block-cyclic load balancing and short-cut sharing. In order to better balance the load for the different threads, a tuning knob directed to the number of data blocks B can be used. Previously, by way of example, B was always equal to T. By turning it into a separate parameter, block-cyclic load balancing can be performed as follows. Whenever a thread finishes its assigned data block, it picks the next unassigned block and processes it. This way, threads that finish their block early due to shortcutting will not sit idle as long as there are more blocks to process.

Additionally, one or more embodiments of the invention include sharing shortcutting information between threads. Once a thread finishes its current data block, it inspects a global variable storing the smallest kth NN-distance found so far. If its local kth NN-distance is smaller, it updates the global variable. If the global variable is smaller, the thread updates its local kth NN-distance and uses that for shortcutting during processing of the next data block. This way, shortcutting information is shared among all threads while requiring global memory access only during data block switching. Because this can never impact run-time negatively, one or more embodiments of the invention use shortcut sharing as the default when block-cyclic load balancing is used.

Figure 5:
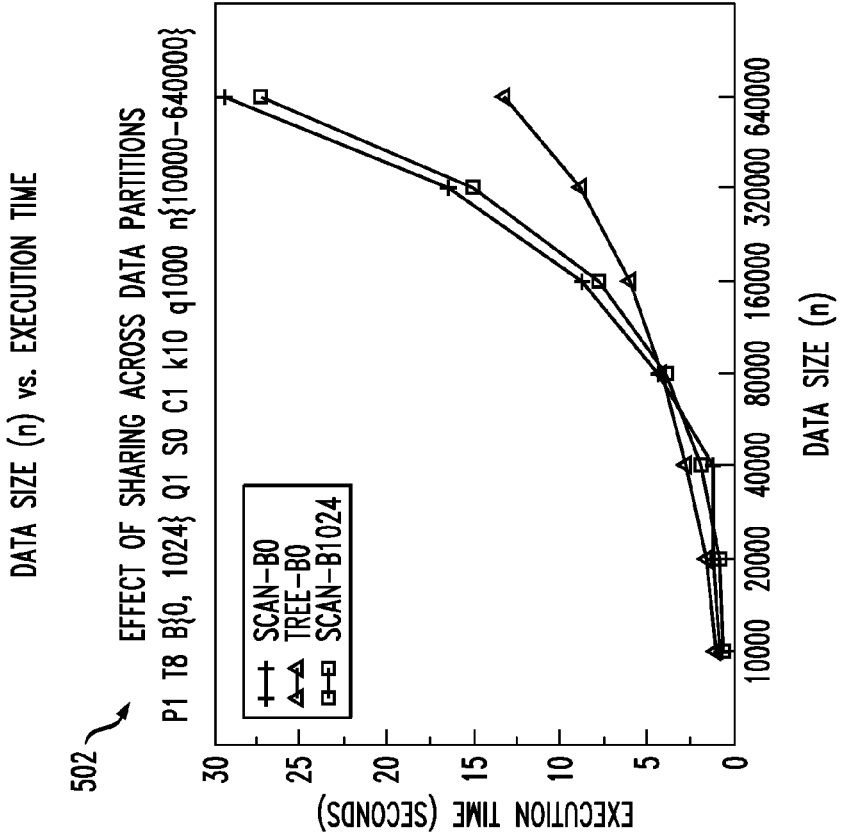
FIG. 5 includes graphs illustrating effect of sharing across data partitions, according to an embodiment of the present invention.

FIG. 5 includes graphs illustrating effect of sharing across data partitions, according to an embodiment of the present invention. Graph 502 depicts the improved scale-up for eight threads. For all dataset sizes, the scan algorithm with B=1024 (denoted by "scan-B1024") is about 10% faster than the version with B=T (denoted by "scan-B0"). This indicates that there is some amount of uneven load between the threads for B=T due to the data distribution.

Graph 504 depicts that the choice of B is not obvious. If B is too small, load balancing will be limited as seen in the 10% overhead for B=T. If B is too large, read sequentiality within a thread is diminished, leading to more L2 cache misses. This leads to the u-shaped graph in graph 504 with a minimum at around B=1024. Again, this value depends on various architectural parameters (for example, cache line size and memory bandwidth).

One or more embodiments of the invention can also include multi-query cache sharing. As detailed herein, it is not uncommon to have a list of multiple pending k-NN queries. Examples can include multi-user systems with thousands of query requests per second and problems that generate a list of NN queries (such as video or music searching). In such scenarios one or more embodiments of the invention can further improve the query throughput by performing one data scan for multiple pending queries rather than one scan for each query. With this query batching, each data vector has to be retrieved only once from main memory for each batch, thereby reducing main memory contention.

For the tree algorithm, sharing of read memory vectors among multiple queries is difficult because each query may explore a different subspace of the data vectors. Therefore, in one or more embodiments of the invention, during the tree traversal (for example, as shown in FIG. 1), each query can descend down to a different child at any given node. Additionally, pending query requests can be collected at the different tree nodes and one can only traverse further down once enough requests have been collected. However, if the buffers at each node are small, limited data sharing is possible. If the buffers are large, the query response time will suffer because it takes longer to collect enough pending requests in a node. For these reasons, multi-query cache sharing is not considered for the tree algorithm. As detailed herein, running concurrent queries on the trees of different data partitions is more beneficial for the tree algorithm.

Figure 6:
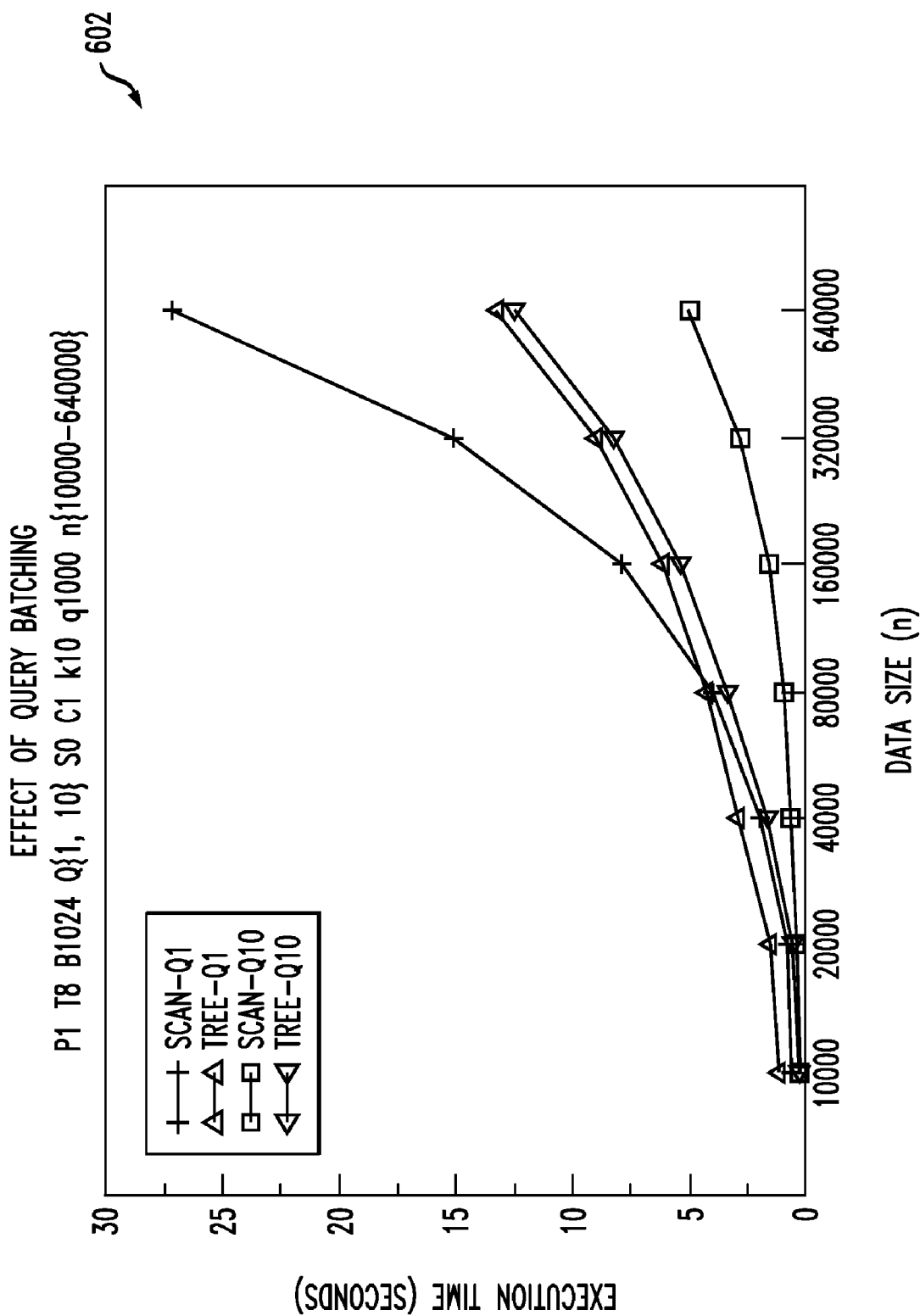
FIG. 6 is a graph illustrating effect of query batching, according to an embodiment of the present invention.

FIG. 6 is a graph 602 illustrating effect of query batching, according to an embodiment of the present invention. By way of illustration, FIG. 6 depicts the effect of query batching on the scan algorithm for varying dataset sizes. In graph 602, two query batch sizes are compared: Q=1 and Q=10. Across all data set sizes, the throughput is increased by a factor of approximately five. As can be seen from graph 602, with Q=10, the scan algorithm is three to five times faster than the tree algorithm.

FIG. 7 includes graphs illustrating effect of query partitioning, according to an embodiment of the present invention. By way of illustration, FIG. 7 depicts graph 702, which illustrates data size (n) versus execution time, graph 704, which illustrates query batch size (Q) versus execution time (no striping), and graph 706, which illustrates query batch size (Q) versus execution time (with striping).

As graph 704 shows, there is a subtle interplay between the number of partitions P, the number of threads per partition T, and the query batch size Q. This graph shows four graphs for four different P/T combinations. For each combination, the query execution time is measured for varying Q. All four graphs exhibit a u-shape, and smaller query batches provide less data sharing among queries and larger query batches.

Figure 8:
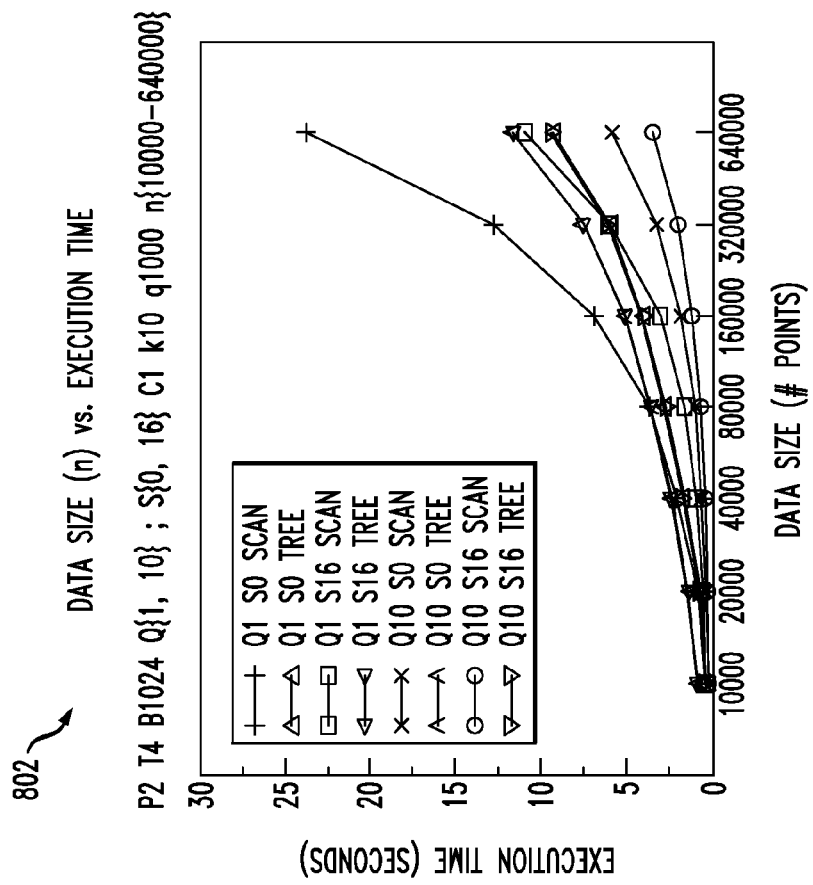
FIG. 8 includes graphs illustrating effect of data striping, according to an embodiment of the present invention.
Figure 9:
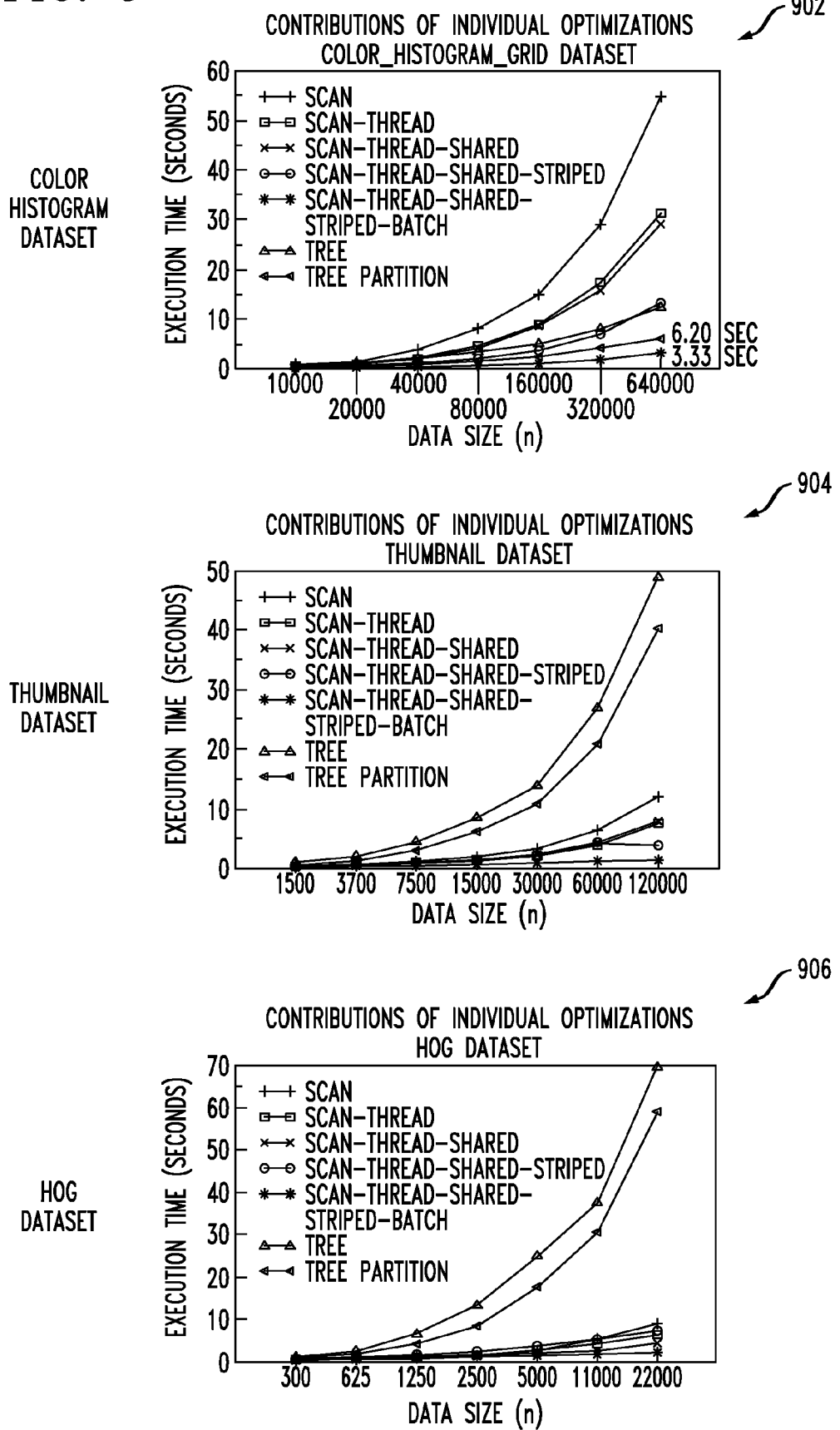
FIG. 9 includes graphs illustrating contributions of individual optimizations (data size (n) vs. execution time), according to an embodiment of the present invention.

FIG. 8 includes graphs illustrating effect of data striping, according to an embodiment of the present invention. By way of illustration, FIG. 8 depicts graph 802, which illustrates data size (n) versus execution time, and graph 804, which illustrates stripe size (S) versus execution time. FIG. 9 includes graphs illustrating contributions of individual optimizations (data size (n) vs. execution time), according to an embodiment of the present invention. By way of illustration, FIG. 9 depicts graph 902, which illustrates a histogram data set, graph 904, which illustrates a thumbnail data set, and graph 906, which illustrates a histogram of oriented gradients (HOG) data set.

Figure 10:
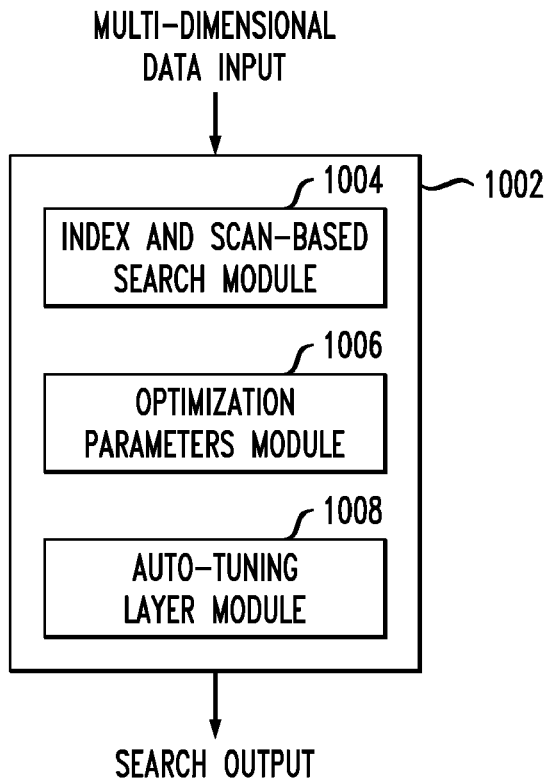
FIG. 10 is a block diagram illustrating an exemplary embodiment, according to an aspect of the invention.

FIG. 10 is a block diagram illustrating an exemplary embodiment, according to an aspect of the invention. By way of illustration, FIG. 10 depicts multi-dimensional data input being received by a parallelization framework 1002 that includes an index and scan-based search module 1004 that expose several architecture-sensitive tunable optimization parameters via an optimization parameters module 1006, which enables tuning the search algorithms to any underlying architecture. Additionally, the framework 1002 includes an auto-tuning layer module 1008 that determines the optimal tuning parameters for a given hardware platform. FIG. 10 also depicts providing a search output.

Figure 11:
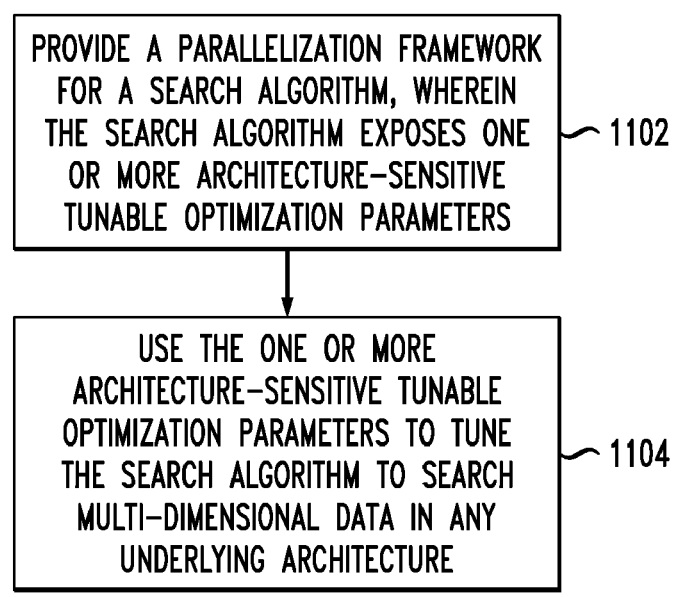
FIG. 11 is a flow diagram illustrating techniques for searching multi-dimensional data, according to an embodiment of the invention.

FIG. 11 is a flow diagram illustrating techniques for searching multi-dimensional data, according to an embodiment of the present invention. Step 1102 includes providing a parallelization framework for a search algorithm (for example, index- and scan-based search algorithms), wherein the search algorithm exposes one or more architecture-sensitive tunable optimization parameters. The architecture-sensitive tunable optimization parameters (also referred to herein as knobs) can include, for example, the following: Query batching, wherein query batching determines which queries are evaluated simultaneously; query partitioning, wherein query partitioning determines how queries are assigned across multiple processors; data partitioning, wherein data partitioning determines how data items are distributed across multiple processors; short-cutting via early-out, wherein early-out enables sharing of local search information across processors in order to reduce individual search times; and/or data striping, wherein data striping determines a data memory layout to improve cache locality.

Step 1104 includes using the one or more architecture-sensitive tunable optimization parameters to tune the search algorithm to search multi-dimensional data in any underlying architecture.

The techniques depicted in FIG. 11 can also include providing an auto-tuning layer on top of the parallelization framework, wherein the auto-tuning layer determines optimal tuning parameters for a given hardware platform (for example, with minimal user intervention). Also, for a given query workload and data, the auto-tuning layer can initialize the architecture-sensitive tunable optimization parameters and iteratively traverse the space of parameter settings while measuring query performance at each step until a steady state is reached.

One or more embodiments of the invention also include auto-tuning a nearest neighbor (NN) algorithm on a multi-core architecture. Also, for example, once NN candidates are determined, their largest distance from the query vector can be used to shortcut all following distance calculations. Additionally, the techniques described herein can include using an offline auto-tuner for setting the architecture-sensitive tunable optimization parameters by iteratively measuring actual query execution times for a given workload and dataset.

The techniques depicted in FIG. 11 also include multi-threading (for example, a tuning step of introducing multiple concurrent threads), wherein multi-threading includes concurrently performing data exploration for a single query and allowing multiple pending queries to run concurrently. Further, one or more embodiments of the invention include block-cyclic load balancing, as well as sharing short-cutting information between threads. By way of example, sharing short-cutting information between threads can result in global memory access being required only during data block switching.

Additionally, one or more embodiments of the invention can include multi-query cache sharing, wherein multi-query cache sharing includes performing one data scan for multiple pending queries. As such, with this query batching, each data vector has to be retrieved only once from main memory for each batch, thereby reducing main memory contention.

The techniques depicted in FIG. 11 can also, as described herein, include providing a system, wherein the system includes distinct software modules, each of the distinct software modules being embodied on a tangible computer-readable recordable storage medium.

Additionally, the techniques depicted in FIG. 11 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 12:
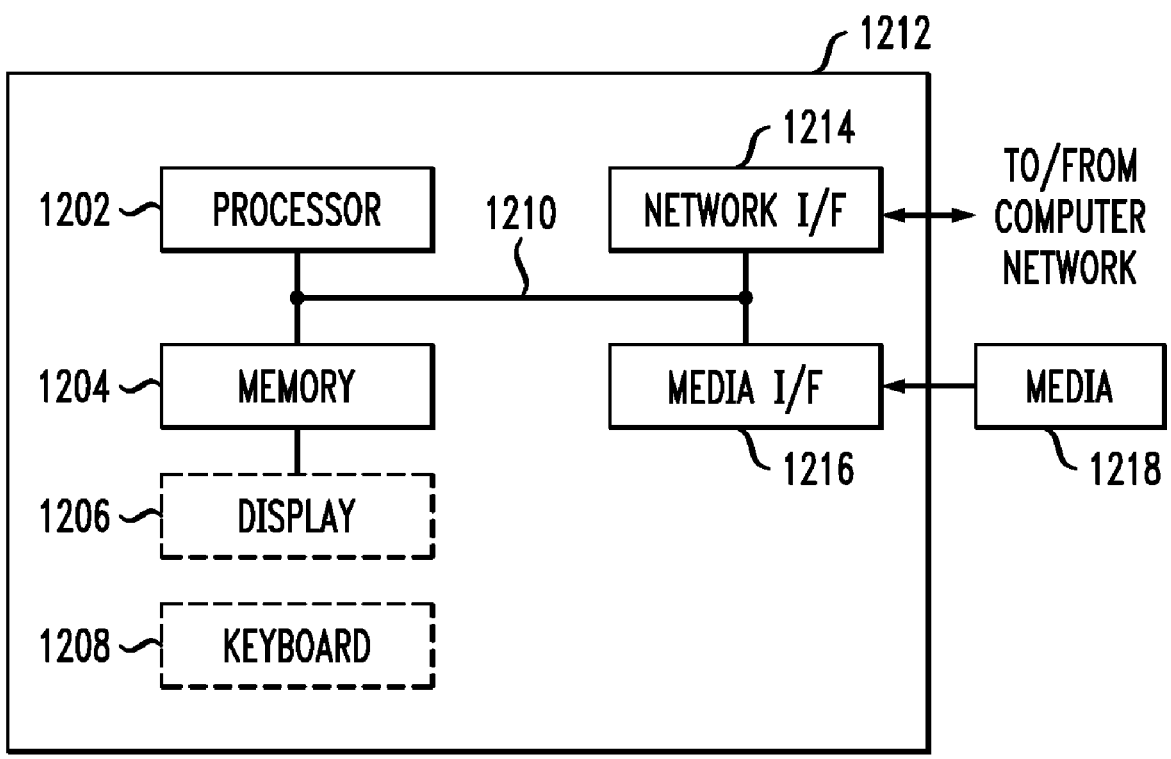
FIG. 12 is a system diagram of an exemplary computer system on which at least one embodiment of the invention can be implemented.

One or more embodiments can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1218 is a non-limiting example.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart to illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 10. The method steps can then be carried out using the distinct software modules and/or sub-modules of the system, as described above, executing on one or more hardware processors 1202. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing a parallelization framework for index and scan based search algorithms that expose several architecture-sensitive tunable optimization parameters.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for searching multi-dimensional data, wherein the method comprises:
    providing a parallelization framework for a search algorithm, wherein said providing is carried out by a module executing on a hardware processor, and wherein the search algorithm exposes architecture-sensitive tunable optimization parameters comprising:
    query batching to determine which queries are evaluated simultaneously;

query partitioning to determine how queries are assigned across multiple processors;

data partitioning to determine how data items are distributed across multiple processors;

short-cutting via early-out to enable sharing of local search information across processors in order to reduce individual search times; and data striping to determine a data memory layout to improve cache locality; and using the architecture-sensitive tunable optimization parameters to tune the search algorithm to search multi-dimensional data in any underlying architecture, wherein said using is carried out by a module executing on a hardware processor.

2. The method of claim 1, further comprising providing an auto-tuning layer on top of the parallelization framework, wherein the auto-tuning layer determines optimal tuning parameters for a given hardware platform.

3. The method of claim 2, wherein for a given query workload and data, the auto-tuning layer initializes the architecture-sensitive tunable optimization parameters and iteratively traverses the space of parameter settings while measuring query performance at each step until a steady state is reached.

4. The method of claim 1, further comprising auto-tuning a nearest neighbor (NN) algorithm on a multi-core architecture.

5. The method of claim 4, further comprising using an offline auto-tuner for setting the architecture-sensitive tunable optimization parameters by iteratively measuring actual query execution times for a given workload and dataset.

6. The method of claim 1, further comprising multi-threading, wherein multi-threading comprises concurrently performing data exploration for a single query and allowing multiple pending queries to run concurrently.

7. The method of claim 1, further comprising block-cyclic load balancing.

8. The method of claim 1, further comprising sharing short-cutting information between threads.

9. The method of claim 1, further comprising multi-query cache sharing, wherein multi-query cache sharing comprises performing one data scan for multiple pending queries.

10. The method of claim 1, further comprising providing a system, wherein the system comprises one or more distinct software modules, each of the one or more distinct software modules being embodied on a tangible computer-readable recordable storage medium, and wherein the one or more distinct software modules comprise an index and scan-based search module, an optimization parameters module and an auto-tuning layer module executing on a hardware processor.

11. A computer program product comprising a tangible computer readable recordable storage medium including computer useable program code for searching multi-dimensional data, the computer program product including:

computer useable program code for providing a parallelization framework for a search algorithm, wherein said providing is carried out by a module executing on a hardware processor, and wherein the search algorithm exposes architecture-sensitive tunable optimization parameters comprising:

query batching to determine which queries are evaluated simultaneously;

query partitioning to determine how queries are assigned across multiple processors;

data partitioning to determine how data items are distributed across multiple processors;

short-cutting via early-out to enable sharing of local search information across processors in order to reduce individual search times; and data striping to determine a data memory layout to improve cache locality; and computer useable program code for using the architecture-sensitive tunable optimization parameters to tune the search algorithm to search multi-dimensional data in any underlying architecture.

12. The computer program product of claim 11, further comprising computer useable program code for providing an auto-tuning layer on top of the parallelization framework, wherein the auto-tuning layer determines optimal tuning parameters for a given hardware platform.

13. The computer program product of claim 11, further comprising computer useable program code for auto-tuning a nearest neighbor (NN) algorithm on a multi-core architecture.

14. The computer program product of claim 11, further comprising computer useable program code for multi-threading, wherein the computer useable program code for multi-threading comprises computer useable program code for concurrently performing data exploration for a single query and allowing multiple pending queries to run concurrently.

15. The computer program product of claim 11, further comprising computer useable program code for multi-query cache sharing, wherein the computer useable program code for multi-query cache sharing comprises computer useable program code for performing one data scan for multiple pending queries.

16. The computer program product of claim 11, wherein the computer useable program code comprises one or more distinct software modules, and wherein the one or more distinct software modules comprise an index and scan-based search module, an optimization parameters module and an auto-tuning layer module executing on a hardware processor.

17. A system for searching multi-dimensional data, comprising:

a memory; and at least one processor coupled to the memory and operative to:

provide a parallelization framework for a search algorithm, wherein said providing is carried out by a module executing on a hardware processor, and wherein the search algorithm exposes architecture-sensitive tunable optimization parameters comprising:

query batching to determine which queries are evaluated simultaneously;

query partitioning to determine how queries are assigned across multiple processors;

data partitioning to determine how data items are distributed across multiple processors;

short-cutting via early-out to enable sharing of local search information across processors in order to reduce individual search times; and data striping to determine a data memory layout to improve cache locality; and use the architecture-sensitive tunable optimization parameters to tune the search algorithm to search multi-dimensional data in any underlying architecture.

18. The system of claim 17, wherein the at least one processor coupled to the memory is further operative to provide an auto-tuning layer on top of the parallelization framework, wherein the auto-tuning layer determines optimal tuning parameters for a given hardware platform.

19. The system of claim 17, wherein the at least one processor coupled to the memory is further operative to auto-tune a nearest neighbor (NN) algorithm on a multi-core architecture.

20. The system of claim 17, wherein the at least one processor coupled to the memory is further operative to multi-thread, wherein multi-threading comprises concurrently performing data exploration for a single query and allowing multiple pending queries to run concurrently.

21. The system of claim 17, further comprising a tangible computer-readable recordable storage medium having one or more distinct software modules embodied thereon, wherein the one or more distinct software modules comprise an index and scan-based search module, an optimization parameters module and an auto-tuning layer module executing on a hardware processor.

22. An apparatus for searching multi-dimensional data, the apparatus comprising:
 means for providing a parallelization framework for a search algorithm via a module executing on a hardware processor, wherein the search algorithm exposes architecture-sensitive tunable optimization parameters comprising:
  query batching to determine which queries are evaluated simultaneously;
  query partitioning to determine how queries are assigned across multiple processors;
  data partitioning to determine how data items are distributed across multiple processors;
  short-cutting via early-out to enable sharing of local search information across processors in order to reduce individual search times; and
  data striping to determine a data memory layout to improve cache locality; and
 means for using the architecture-sensitive tunable optimization parameters to tune the search algorithm to search multi-dimensional data in any underlying architecture via a module executing on a hardware processor.

* * * * *